(12) United States Patent
Hanada et al.

(10) Patent No.: US 6,886,524 B2
(45) Date of Patent: May 3, 2005

(54) CONTROL APPARATUS FOR HYBRID VEHICLE

(75) Inventors: Kohei Hanada, Utsunomiya (JP); Teruo Wakashiro, Shioya-gun (JP); Shigetaka Kuroda, Utsunomiya (JP); Takahiro Yonekura, Utsunomiya (JP); Makoto Kishida, Frankfurt am Main (DE); Tomohiro Nishi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 3 days.

(21) Appl. No.: 10/633,569

(22) Filed: Aug. 5, 2003

(65) Prior Publication Data

US 2004/0035113 A1 Feb. 26, 2004

(30) Foreign Application Priority Data

Aug. 8, 2002 (JP) ........................................ 2002-231726

(51) Int. Cl.[7] .............................. B60K 6/04; B60L 1/00
(52) U.S. Cl. ...................... 123/198 F; 180/65.3; 701/22
(58) Field of Search ............................. 123/198 F, 481; 180/65.2, 65.3, 65.4, 65.6; 701/22, 70

(56) References Cited

U.S. PATENT DOCUMENTS 5,789,881 A  8/1998  Egami et al.
6,116,363 A  9/2000  Frank
6,691,807 B1 * 2/2004  Bhavsar et al. ............ 180/65.2

FOREIGN PATENT DOCUMENTS

| EP | 0 755 816 A2 | 1/1997 |
| EP | 1 128 044 A2 | 8/2001 |
| JP | 11-182275 | 7/1999 |
| JP | 11-350995 | 12/1999 |
| JP | 2000-027670 | 1/2000 |
| JP | 2001-207886 | 8/2001 |
| JP | 2002-013423 | 1/2002 |
| JP | 2002-054474 | 2/2002 |
| JP | 2002-070599 | 3/2002 |

* cited by examiner

Primary Examiner—Henry C. Yuen
Assistant Examiner—Hyder Ali
(74) Attorney, Agent, or Firm—Arent Fox, PLLC (57) ABSTRACT

In order to improve the fuel consumption efficiency of a hybrid vehicle, a control apparatus 1 for a hybrid vehicle is provided, which comprises as a power source a motor M and an engine E capable of executing partial cylinder deactivation operation and the driving force of at least one of these is transmitted to wheels for running the vehicle. When the required output is larger than the output of the engine under partial cylinder deactivation operation, and is smaller than the total output of the engine and the motor, which is adjustable for assisting the engine, the control apparatus operates the engine under partial deactivation and adjusts the motor output so as to compensate the difference between the total output of the power source and the output of the partial cylinder deactivated engine.

6 Claims, 6 Drawing Sheets

CONTROL APPARATUS FOR HYBRID VEHICLE

BACKGROUND OF THE INVENTION

1. Field of the Invention

The present invention relates to a control apparatus for a hybrid vehicle which is able to drive by transmitting the driving force from at least one of an engine that can perform partial cylinder deactivation operation and a motor to the wheels.

2. Description of the Related Art

As disclosed in Japanese Unexamined Patent Application, First Publication No. 11-350995, for example, there is known a hybrid vehicle provided with an engine and a motor as the power source of the vehicle, in which the motor assists the engine as a power source when the vehicle is running.

Furthermore, as an engine of low fuel consumption there is known an engine which freely switches between all cylinders operation in which all the cylinders are operating, and partial cylinder deactivation operation (cylinder deactivation operation) in which one part of the cylinders are deactivated, and by performing cylinder deactivation operation in cases where cylinder deactivation operation is possible, such as when running at a low speed, and so on, an improvement in fuel consumption efficiency is obtained.

However, in the case of using an engine in which partial cylinder deactivation is possible, due to a difference in the output or torque generated under all cylinders operation, and the output or torque generated under cylinder deactivation operation, there is concern that shock will be generated when switching operation between all cylinders operation and cylinder deactivation operation. In order to prevent this, when switching operation between all cylinders operation and cylinder deactivation operation, the difference in output or torque at the time of switching operation is adjusted by controlling the motor.

However, in the case where the output or torque required by the power source according to the depression amount of the accelerator pedal or the like, is larger than the engine output or torque generated under cylinder deactivation operation, conventional technology immediately switches to all cylinders operation. Therefore, an extension of the range in which cylinder deactivation operation is possible is to be desired, in order to obtain a further improvement in fuel consumption efficiency.

SUMMARY OF THE INVENTION

The present invention takes the above situation into consideration, with the object of providing a control apparatus for a hybrid vehicle in which fuel consumption efficiency can be improved by widening the range in which cylinder deactivation operation is possible.

In order to solve the above problem, a first aspect of the present invention is a control apparatus for a hybrid vehicle which comprises a motor (for example, the motor M in the embodiment) and an engine (for example, the engine E in the embodiment) capable of cylinder deactivation operation running with some cylinders deactivated, as a power source, and wherein the driving force of at least one of these is transmitted to the wheels (for example, the wheels Wf in the embodiment) to enable travelling, wherein in a case where the output or torque required by the power source is larger than the engine output or torque under cylinder deactivation operation, and is smaller than the engine output or torque combined with the output or torque able to be adjusted by the motor, the engine is operated under cylinder deactivation operation, and control is performed to adjust the difference between the engine output or torque under cylinder deactivation operation and the required output or torque, by means of the motor (for example, step S410 in the embodiment).

According to this aspect of the invention, even in the case where the required output or torque is larger than the output or torque of the engine under cylinder deactivation operation, in the case where this is smaller than the engine output or torque combined with the output or torque able to be adjusted by the motor, by controlling the motor as described above, the required output or torque can be supplied by operating the engine under cylinder deactivation operation.

That is, in the case where the engine is operating under cylinder deactivation operation, cylinder deactivation operation continues to be performed, and in the case where the engine is operating under all cylinders activated operation, a switch to cylinder deactivation operation is performed.

In this way, cylinder deactivation operation is possible even in the case where the required output or torque is larger than the output or torque of the engine under cylinder deactivation operation. Therefore it becomes possible to extend the range in which cylinder deactivation operation is possible, and as a result, an improvement in fuel consumption efficiency can be obtained.

Furthermore, in the case where the required output or torque becomes greater than the combined output or torque of the engine under cylinder deactivation operation and the output or torque able to be adjusted by the motor, a transfer to all cylinders operation in which all the cylinders of the engine are operating is possible. Also, when switching between cylinder deactivation operation and all cylinders operation, it is preferable to control so as to adjust the difference in the output or torque of cylinder deactivation operation and all cylinders operation by means of the motor and an accelerator wire or the like which controls and the degree of throttle opening.

In the second aspect of the invention according to the first aspect, it is determined whether the cylinder deactivation operation is possible based on at least one of the parameters of; the temperature of the motor, the state of charge (for example, the state of charge SOC in the embodiment) of a power storage unit (for example, the battery 3 in the embodiment) which is able to transfer energy from the motor or the temperature of the power storage unit, and the temperature of electrical equipment connected to the power storage unit.

According to this aspect of the invention, it is possible to determine whether the cylinder deactivation operation is possible or not, under even more detailed conditions, using the temperature of the motor, the state of charge of the power storage unit which is able to transfer energy from the motor or the temperature of the power storage unit, and the temperature of electrical equipment connected to the power storage unit.

In the third aspect of the present invention according to the first aspect, when the output is adjusted by controlling the motor, the output or torque of the engine under partial cylinder deactivated operation is maintained at an output or torque (for example, the torque TRQ1 in the embodiment) to give the lowest net fuel consumption.

According to this aspect of the invention, even in a state where supply of required output or torque is possible by the output or torque of the engine under the partial cylinder deactivation operation, in the case where that output or torque becomes an output or torque that is higher than the set value and higher than the specific net fuel consumption, the output or torque of the engine is maintained at the output or torque which gives the lowest net fuel consumption, and the difference with the output or torque required by the power source is adjusted by means of the motor. As a result, fuel supplied by the engine can be used extremely effectively, and it becomes possible to greatly contribute to an improvement in fuel consumption efficiency.

In the fourth aspect of the present invention according to the first aspect, the output or torque of the motor is controlled for adjusting the output of the power source based on at least one of the parameters of; the rating of the motor, the temperature of the motor, and the state of charge of the power storage unit or the temperature of the power storage unit.

According to this aspect of the invention, the output or torque of the motor is controlled for adjusting the power output by the motor using at least one of the ratings of the motor, the temperature of the motor, and the state of charge of the power storage unit or the temperature of the power storage unit, even more detailed control becomes possible.

In the fifth aspect of the invention according to the first aspect, when the operating state of the engine is switched between the cylinder deactivation operation and all cylinders activated operation in which all the cylinders of the engine are operating, a difference between the output or torque generated under all cylinders operation and the output or torque generated by the engine under cylinder deactivation operation, is adjusted by controlling the degree of opening of an electronic control throttle (for example, the electronic control throttle 16 in the embodiment).

According to this aspect of the invention, it becomes possible to adjust the difference in output or torque when switching operating states, more quickly and accurately. As a result, the possibility of discomfort occurring when switching operating states can be further reduced.

In the sixth aspect of the present invention according to the first aspect, the combined output or torque of the output or torque generated by the engine and the output or torque generated by the motor, is controlled so as to be equivalent if the operating conditions such as the required output are the same.

According to this aspect of the invention, even in the case where the output or torque generated by the motor and the output or torque generated by the engine are restricted by the parameters or the like, if the operating conditions such as the accelerator pedal opening are the same, the driving force of the vehicle is controlled so as to always be equivalent. Therefore, even in cases of operating in a plurality of travelling modes, the possibility of discomfort occurring can be reduced, without changing the driving force characteristics of the vehicle with respect to the operation of the accelerator pedal.

DETAILED DESCRIPTION OF THE INVENTION

Hereunder, an embodiment of the present invention is described with reference to the appended drawings.

Figure 1:
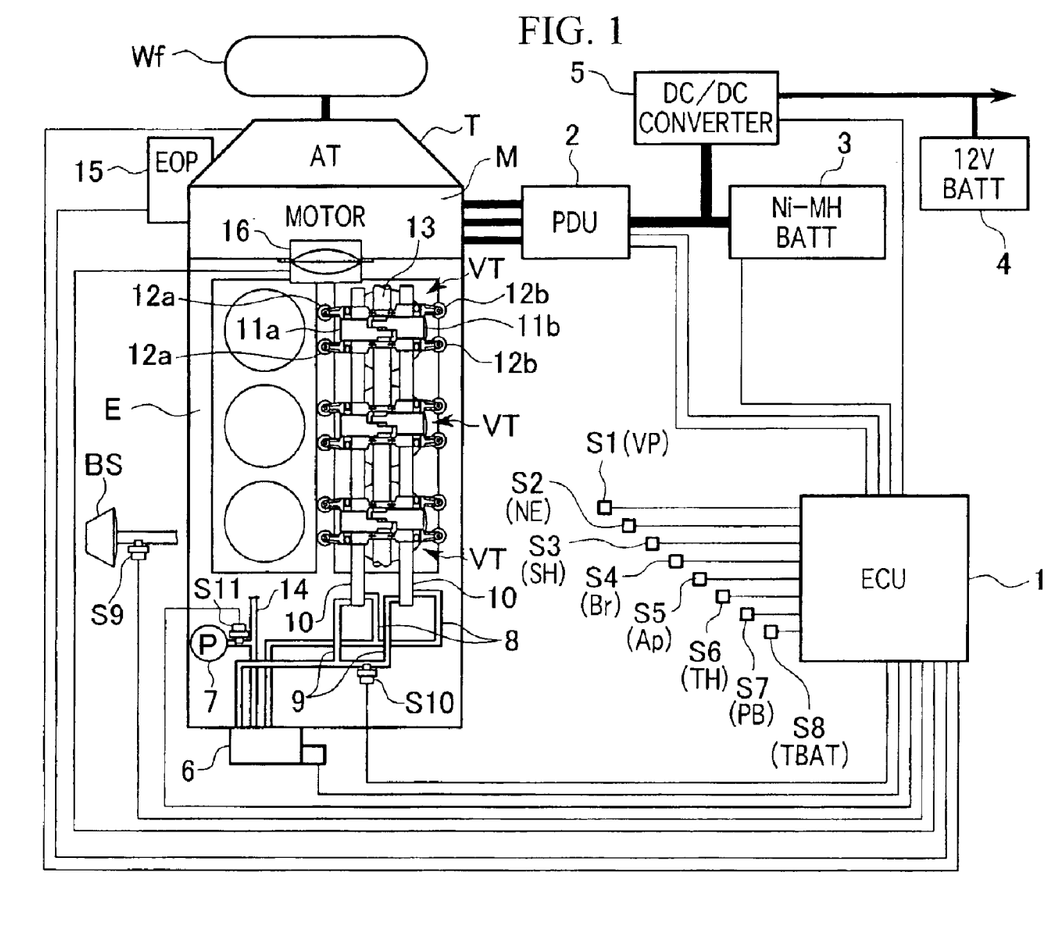
FIG. 1 is an overall block diagram, showing a hybrid vehicle according to an embodiment of the present invention.

FIG. 1 shows a parallel hybrid vehicle of an embodiment of the invention, comprising an engine E, a motor M, and a transmission T connected in series. The driving forces from both the engine E and the motor M are transmitted to front wheels Wf (rear wheels or front-rear wheels also acceptable) serving as drive wheels, via a transmission T such as an AT (automatic transmission) or the like (manual transmission MT also acceptable). Furthermore, when a driving force is transmitted to the motor M side from the front wheels Wf at the time of deceleration of the hybrid vehicle, the motor M functions as a generator to produce so called regenerative braking, and the kinetic energy of the vehicle is recovered as electrical energy.

The drive and regenerative braking of the motor M are performed by a power drive unit (PDU) 2, which receives control instructions from an ECU 1. A nickel-hydrogen battery (power storage unit) 3 of a high-tension system for transferring electrical energy to and from the motor M is connected to the power drive unit 2. Reference symbol 4 denotes a 12-volt auxiliary battery for operating various auxiliary equipment, and this auxiliary battery 4 is connected to the battery 3 via a down converter 5 which is a DC-DC converter. The down converter 5, which is controlled by the ECU 1, reduces the voltage of the battery 3 to charge the auxiliary battery 4. The ECU 1 protects the battery 3, and calculates the state of charge SOC.

The ECU 1, in addition to controlling the down converter 5, also controls a fuel supply control device (not shown in figure) which controls the amount of fuel supplied to the engine E, and controls the ignition timing and the like. Therefore, inputs to the ECU 1 are: a signal from a speed sensor SI for detecting the speed VP, a signal from an engine speed sensor S2 for detecting the engine speed NE, a signal from a gear shift position sensor S3 for detecting the shift position SH of the transmission T, a signal from a brake switch S4 for detecting the operation of a brake (Br) pedal, a signal from an accelerator pedal opening sensor S5 which shows accelerator pedal opening, a signal from a throttle opening sensor S6 for detecting throttle opening TH, a signal from an inlet pipe negative pressure sensor S7 for detecting inlet pipe negative pressure PB, and a signal from a battery temperature sensor S8 for detecting temperature TBAT of the battery 3.

Reference symbol BS denotes a brake servo connected to a brake pedal. A master power internal negative pressure sensor S9 for detecting the brake master power internal negative pressure is installed in this brake servo BS. This master power internal negative pressure sensor S9 is also connected to the ECU 1. Also, a POIL sensor S10, the solenoid of a spool valve 6, and a TOIL sensor S11, which are mentioned later, are connected to the ECU 1.

The engine E is a so called SOHC V6 cylinder engine, and the three cylinders on one bank have a structure provided with a variable valve timing mechanism VT, with which it is possible to deactivate the cylinder operation, while the three cylinders on the other bank have a structure provided with a normal valve operating system (not shown in figure) which does not deactivate operation of the cylinder (cylinder deactivation operation). The three cylinders in which cylinder deactivation is possible have a structure in which each of the two inlet valves and the two exhaust valves are able to maintain their closed state by means of the variable valve timing mechanism VT, through the medium of the oil pressure pump 7, the spool valve 6, the cylinder deactivation side path 8, and the cylinder deactivation cancellation side path 9.

Specifically, when part of the operating oil supplied from the oil pressure pump 7 to the engine lubrication system is supplied through the spool valve 6 to the cylinder deactivation side path 8 of the bank in which cylinder deactivation is possible, the cam lift rocker arm 11a (11b) and the valve driving rocker arms 12a (12b), each supported by a rocker shaft 10, and which until now were driving as one, become possible to drive separately. Therefore the driving force of the cam lift rocker arms 11a and 11b which drive by means of the revolution of the cam shaft 13 is not transmitted to the valve driving rocker arms 12a and 12b, and the inlet valve and the exhaust valves remain in a closed state. As a result, the inlet valves and the exhaust valves of the three cylinders are closed, enabling the cylinder deactivation operation. The POIL sensor S10 is provided in the cylinder deactivation cancellation side path 9 and detects the oil pressure of the cylinder deactivation cancellation side path 9 when the cylinders are deactivated. The TOIL sensor S11 is provided in the lubrication system piping 14 of the oil pump 7 and detects the oil temperature. Reference symbol 15 denotes an electric oil pump, and reference symbol 16 denotes an electronic control throttle (DBW).

Consequently, the engine E can be switched between three-cylinder operation (cylinder deactivation operation) in which the three cylinders of one side bank are deactivated, and six cylinder operation (all cylinders operation) in which all six cylinders of both side banks are operating.

Here, the control modes of this hybrid vehicle are: 'idle mode', 'idle stop mode', 'deceleration mode', 'acceleration mode', and 'cruise mode'. In the idle mode, fuel supply is resumed after fuel supply cut, to maintain the engine E in an idle condition, and in the idle stop mode, for example at the time the engine is stopped, the engine is stopped in a defined condition. Furthermore, in the deceleration mode the motor M performs regenerative braking, in the acceleration mode the motor M drives the engine E, and in the cruise mode the motor M is not driven to assist the engine E, so that the vehicle runs under the driving force of the engine E.

Figure 2:
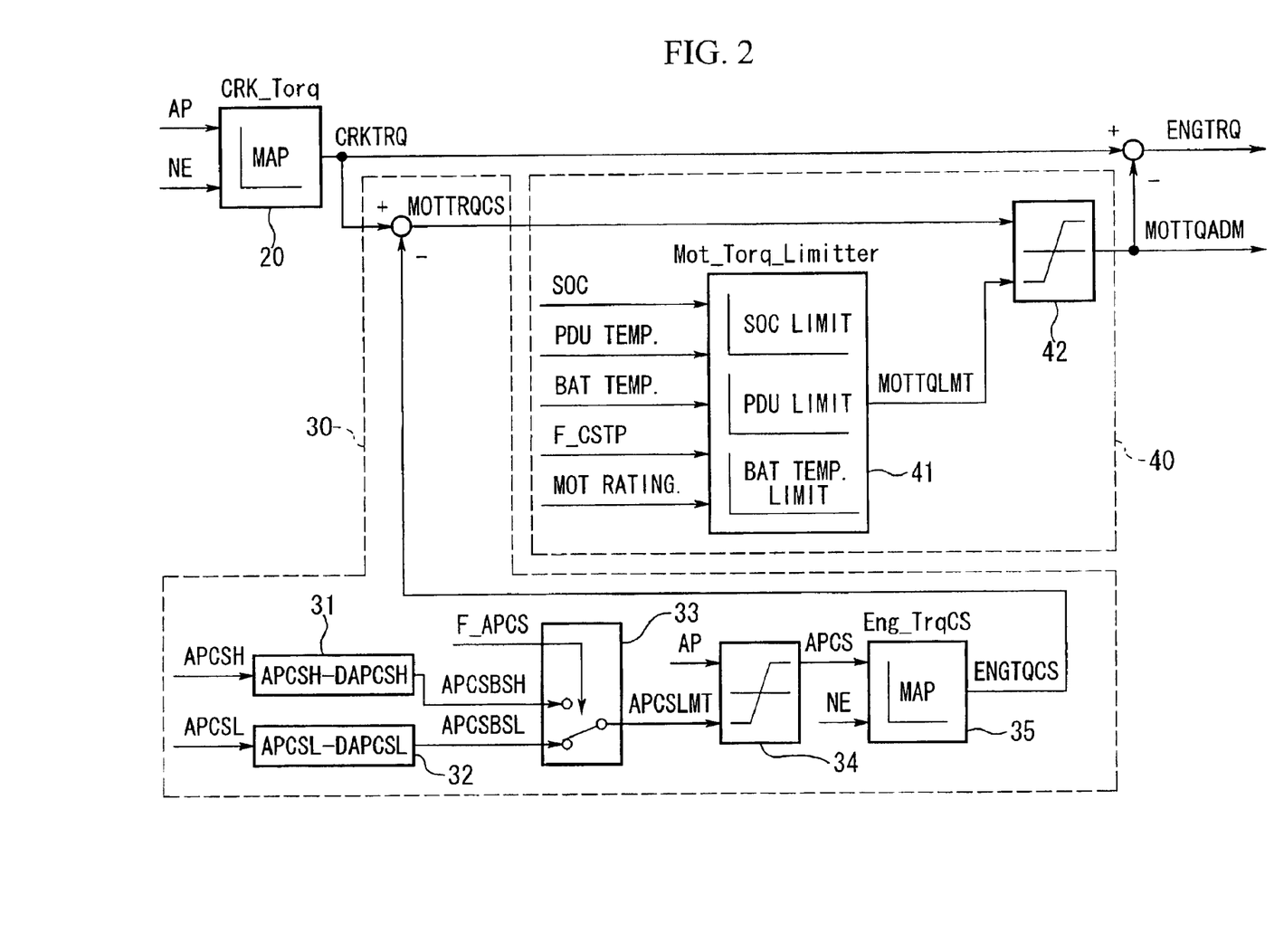
FIG. 2 is a block diagram showing the ECU in FIG. 1 in more detail.

FIG. 2 is a block diagram showing the ECU in FIG. 1 in more detail. As shown in both figures, the ECU 1 has; a crank shaft torque calculating section 20 which calculates the entire torque required by the crank shaft CRKTRQ, a motor assist amount calculating section 30 which calculates the torque amount of assist possible by the motor M, and a motor torque limiting management section 40 which restricts the amount of torque supplied by the motor M.

An accelerator pedal depression amount (accelerator pedal opening) AP, and an engine speed NE are input to the crank shaft torque calculating section 20, and from these the crank shaft entire required torque (crank shaft torque) CRKTRQ is retrieved, based on a table CRK_Torq.

The motor assist amount calculating section 30 obtains the torque able to be supplied by the engine E during cylinder deactivation operation ENGTQCS, for calculating the motor torque MOTTRQ during cylinder deactivation operation by subtracting this torque ENGTQCS from the crank shaft torque.

Also, the motor assist amount calculating section 30 has accelerator pedal opening threshold value calculating sections 31 and 32 for determining the switching between the cylinder deactivation operation and the all cylinders operation. The threshold value calculating section 31 is for calculating a threshold value APCSBSH, which switches from cylinder deactivation operation to all cylinders operation, and the threshold value calculating section 32 is for calculating a threshold value APCSBSL which switches from all cylinders operation to cylinder deactivation operation.

In the threshold value calculating sections 31 and 32, by subtracting predetermined values DAPCSH and DAPCSL from previous threshold values APCSH and APCSL which have been input respectively, the threshold values APCSBSH and APCSBSL having hysteresis can be calculated. In this way, because the threshold value is reciprocated each time, hunting, which switches incessantly between all cylinders operation and cylinder deactivation operation, can be prevented.

The threshold values APCSBSH and APCSBSL are each input to a threshold value selecting section 33. In the threshold value selecting section 33, either one of these input threshold values is selected and output to a filter section 34 as a limiting value APCSLMT. Selection of this threshold value is performed by a flag F_APCS which determines the operating condition of the engine E. In the case where the engine E is in cylinder deactivation operation, APCSBSH is selected as the limiting value, and in the case where all cylinders are operating, APCSBSL is selected as the limiting value.

The limiting value APCSLMT and the actual accelerator pedal opening AP are input to the filter section 34. The filter section 34 compares the limiting value APCSLMT and the accelerator pedal opening AP, and selects whichever is smaller. Then, the selected value is transmitted to a cylinder deactivation engine torque calculating section 35, as a cylinder deactivation accelerator opening APCS for at the time of cylinder deactivation operation.

The cylinder deactivation engine torque calculating section 35, receives inputs of the cylinder deactivation accelerator opening APCS and the engine speed NE, and based on these, retrieves the cylinder deactivation engine torque ENGTQCS able to be supplied at the time of cylinder deactivation operation, from a table Eng_TrqCS. The torque after subtracting this cylinder deactivation engine torque ENGTQCS from the crank shaft torque CRKTRQ, becomes a cylinder deactivation motor torque MOTTRQCS able to be supplied by the motor M at the time of cylinder deactivation operation. This torque MOTTRQCS is transmitted to the motor output limiting management section 40.

The motor output (torque) limiting management section 40 has a limiting torque calculating section 41, and a filter section 42. The limiting torque calculating section 41 calculates the motor torque which is limited by torque limiting factors such as; the state of charge SOC of the battery 3 being the power storage unit, the temperature of the PDU (power drive unit), the temperature of the battery 3, the value of the flag F_CSTP determining whether cylinder deactivation is in operation, and the motor M rating (rated power of the motor M), based on each of these limiting factors. Then, the smallest torque from among these calculated torques is transmitted to the filter section 42 as a limiting motor torque MOTTRQLMT.

The limiting motor torque MOTTRQLMT and the cylinder deactivation motor torque MOTTRQCS are input to the filter section 42. The filter section 42 compares the limiting motor torque MOTTRQLMT and the cylinder deactivation motor torque MOTTRQCS, and whichever is smallest is selected to be the MOTTRQADM. This selected torque MOTTRQADM is supplied by the motor M. This torque MOTTRQADM is also subtracted from the crank shaft torque CRKTRQ to calculate the engine torque ENGTRQ, and this engine torque ENGTRQ is supplied by the engine E.

Figure 3:
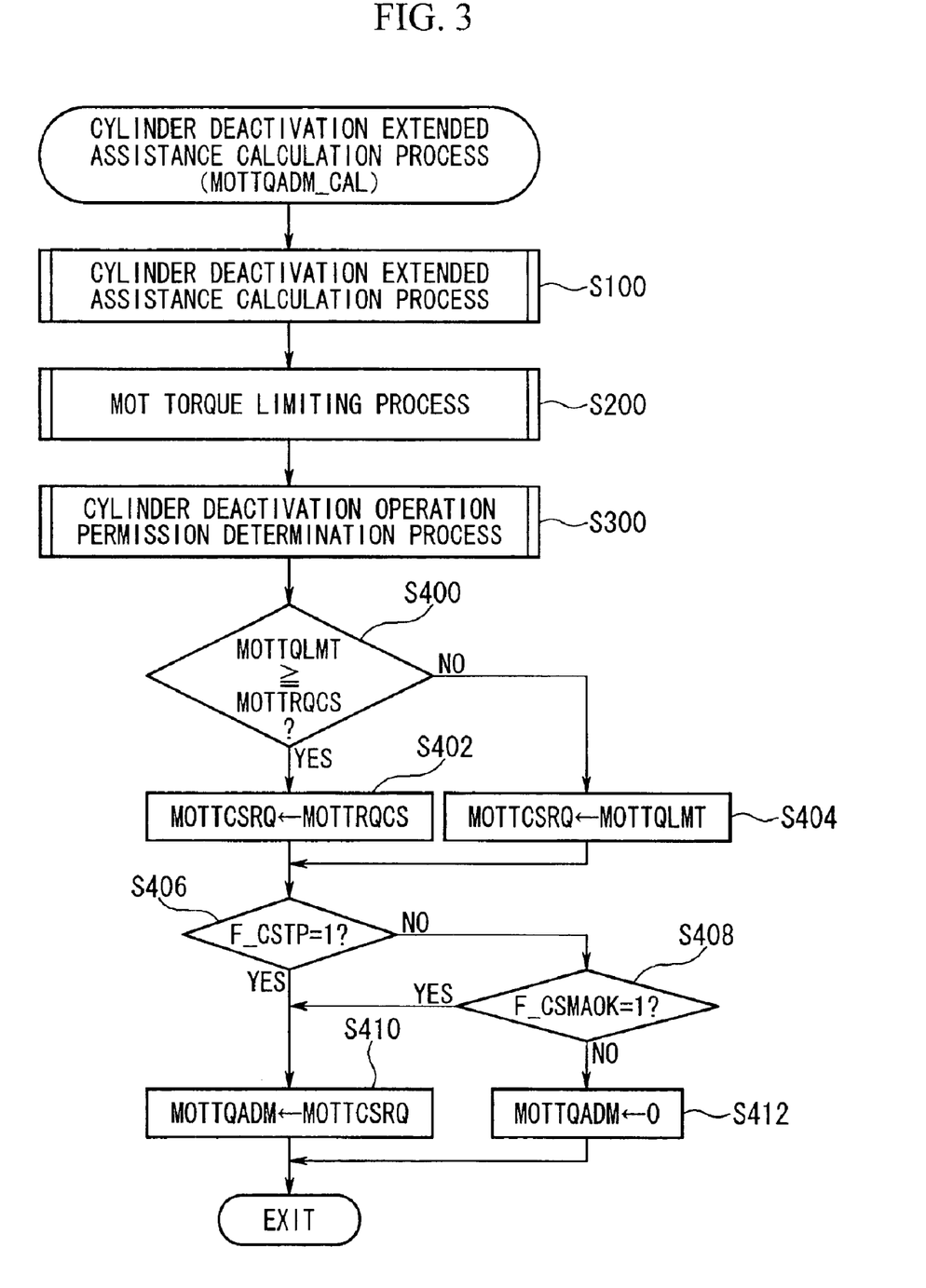
FIG. 3 is a flow chart showing a cylinder deactivation extended assist calculation process in the control apparatus of the hybrid vehicle in FIG. 1.

FIG. 3 is a flow chart showing a cylinder deactivation extended assist calculation process.

Firstly, in step S100, the cylinder deactivation extended assist calculation process is performed. This calculation process is performed by the motor assist amount calculating section 30. This calculation process is described using FIG. 4.

Figure 4:
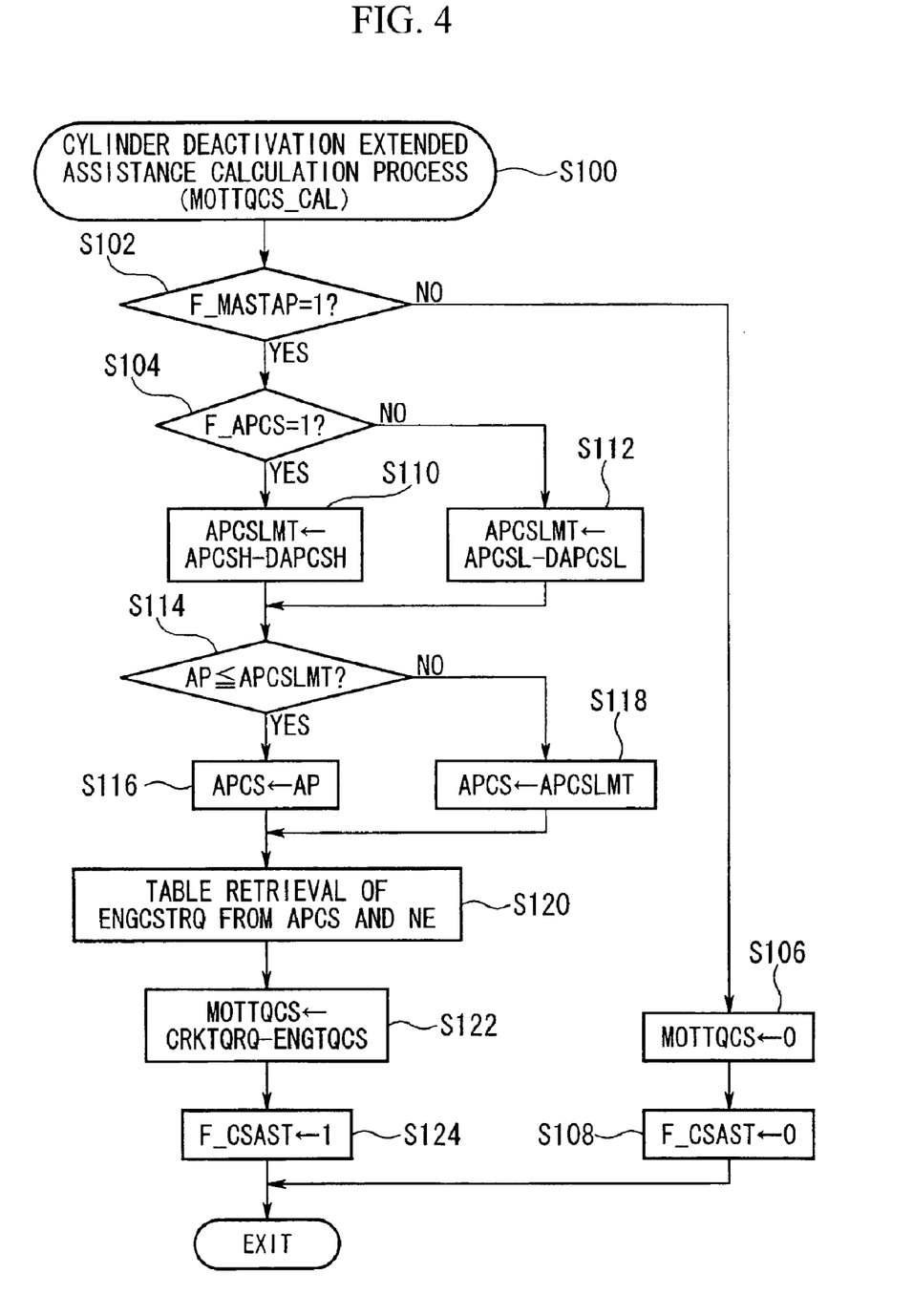
FIG. 4 is a sub flow chart showing the cylinder deactivation extended assist calculation process in FIG. 3 in more detail.

Firstly, as shown in step S 102 in the same figure, it is determined whether the value of a flag F_MASTAP, which determines whether cylinder deactivation is possible, is "1" or not. If this determination is "NO", "0" is substituted for the cylinder deactivation motor torque MOTTRQCS value at step S106, and "0" is substituted for the cylinder deactivation assist flag F_CSAST at step S108, thereby completing the cylinder deactivation extended assist calculation process.

If the determination in step S102 is "YES", in step S104 it is determined whether the value of a flag F_APCS is "1" or not. This flag F_APCS is a flag which determines the engine operating state, and if the engine E is operating as cylinder deactivation, the value is "1", and if all cylinders are operating, the value is "0".

If the determination in step S104 is "YES", a threshold value APCSLMT is selected to move from cylinder deactivation operation to all cylinders operation (see the process by the threshold value calculating section 31 and the threshold value selecting section 33). This threshold value APCSLMT is the predetermined value DAPCSH subtracted from the previous threshold value APCSH. In this way, by changing the threshold value, hunting can be prevented. Next, the flow proceeds to step S114.

On the other hand, if the determination at step S104 is "NO", a threshold value APCSLMT is selected to move from all cylinders operation to cylinder deactivation operation (see the process by the threshold value calculating section 32 and the threshold value selecting section 33). This threshold value APCSLMT is the predetermined value DAPCSL subtracted from the previous threshold value APCSL. Next, the flow proceeds to step S114.

In step SI 14, the limiting value APCSLMT and the actual accelerator pedal opening AP are compared, to determine whether the accelerator pedal opening AP is equal to or less than the limiting value APCSLMT. In the case where this determination is "YES", at step S116 the actual accelerator pedal opening AP is substituted for the cylinder deactivation accelerator pedal opening APCS, and the flow proceeds to step S120. In the case where the determination at step S114 is "NO", at step S118 the limiting value APCSLMT is substituted for the cylinder deactivation accelerator pedal opening APCS, and the flow proceeds to step S120.

In step S120, the cylinder deactivation engine torque ENGTRQCS is obtained from the cylinder deactivation accelerator pedal opening APCS and the engine speed NE by retrieval from a table. Next, at step S122, this cylinder deactivation engine torque ENGTRQCS is subtracted from the required crank shaft torque CRQTRQRQ, to calculate the cylinder deactivation motor torque MOTTRQ. Then, "1" is substituted for a cylinder deactivation assist flag F_CSCAST, to complete the assist calculation process.

Next, in step S200, a motor torque limiting process is performed. The motor torque limiting process is performed by the motor torque limiting management section 40. Motor torques, which are limited from the previously mentioned torque limiting factors, are respectively calculated based on each of these limiting factors, and the smallest from among these torques is calculated as the limiting motor torque MOTTRQLMT.

Next, in step S300, a cylinder deactivation operation authorization determination process is performed.

In the above determinations, in the case where any one of the conditions are not met, "0" is substituted for the value of a cylinder deactivation operation authorization flag F_CSMAOK. This is because it is preferable not to perform cylinder deactivation operation in the case where these conditions are not met.

Specifically, it is determined whether the cylinder deactivation motor torque MOTTQCS needed by the cylinder is equal to or less than the limiting motor torque MOTTRQLMT, whether the vehicle operating mode is a standard mode (not a special mode such as starting mode), whether the negative pressure of the inlet pipe is maintaining a reasonable range, whether the gear shift position is in a reasonable position (not neutral or reverse), whether the engine cooling water TW is equal to or above a predetermined value, whether the vehicle speed is equal to or greater than a minimum vehicle speed, whether the engine speed NE of the engine E is equal to or greater than a minimum engine speed, whether the condition of the engine E is normal, whether the range of the catalyser temperature is reasonable, whether the oil pressure of the engine E is reasonable, and so on. When all these conditions have been met, "1" is substituted for the value of the cylinder deactivation operation authorization flag F_CSMAOK.

Next, in step S400, it is determined whether the limiting motor torque MOTTQLMT is larger than the motor cylinder deactivation torque MOTTRQCS. In the case where this determination is "YES", in step S402 the cylinder deactivation motor torque MOTTRQCS is substituted for the required motor cylinder deactivation torque MOTTCSRQ, and the flow proceeds to step S406. In the case where the determination at step S400 is "NO", in step S404 the limiting value MOTTRQLMT is substituted for the required motor cylinder deactivation torque MOTTCSRQ, and the flow proceeds to step S406.

In step S406, it is determined whether the value of a cylinder deactivation determination flag F_CSTP is "1". In the case where this determination is "YES", this is the case where the engine E is in cylinder deactivation operation, and the flow proceeds to step S410, where the required cylinder deactivation motor torque MOTTCSRQ is substituted for a management motor torque MOTTQADM, to complete the process. In the case where the determination at step S406 is "NO", this is the case where the engine E is in all cylinders operation, and in this case the flow proceeds to step S408.

In step S408, it is determined whether the value of the cylinder deactivation motor assist authorization flag F_CSMAOK is "1" or not. In the case where this determination is "YES", because this is a case where it is possible to assist the engine E by supplying torque by the motor M, the flow proceeds to step S410, and the required cylinder deactivation motor torque MOTTCSRQ is substituted for the management motor torque MOTTQADM, to complete the process. In this case, assist is performed by the motor M, and in the case where all cylinders had been operating, the engine is switched to the cylinder deactivation operation.

If the determination in step S408 is "NO", the flow proceeds to step S412, and "0" is substituted for the management motor torque MOTTRQADM value. In this case, assist (supply of torque) by the motor M is not performed, and in the case where the partial cylinder deactivation is in operation, the engine is switched to the all cylinders operation.

Figure 5:
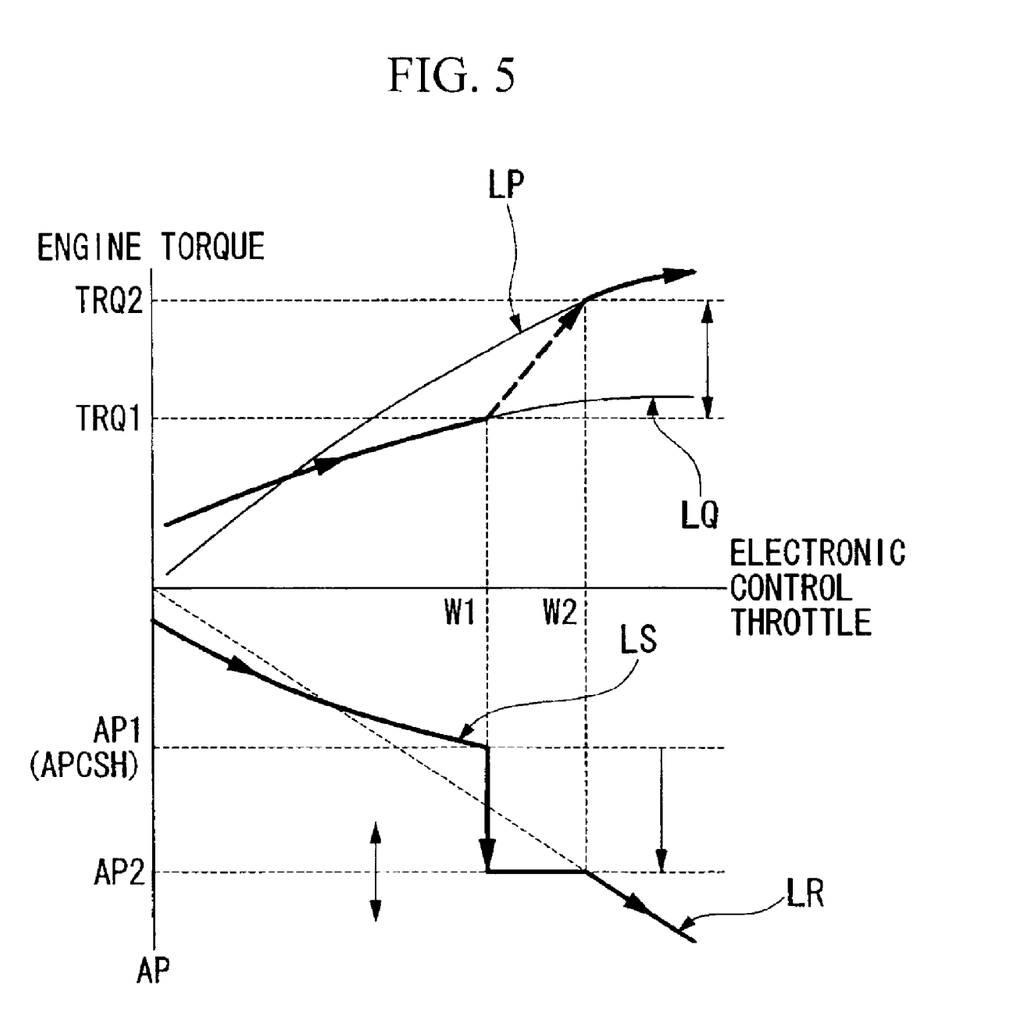
FIG. 5 is a graph showing the relationship between electronic control throttle opening, and the engine torque and accelerator pedal, when moving from cylinder deactivation operation to all cylinders operation.

FIG. 5 is a graph showing the relationship between electronic control throttle opening, and the engine torque and accelerator pedal, when moving from cylinder deactivation operation to all cylinders operation. The horizontal axis of this graph represents the electronic control throttle opening, the upper part of the vertical axis represents the engine torque, and the lower part of the vertical axis represents the accelerator pedal opening. Moreover, the lines LP and LQ denote the engine torque depending on the electronic control throttle opening in the cases of all cylinders operation and cylinder deactivation operation, respectively. Furthermore, the lines LR and LS denote the accelerator pedal opening (AP) depending on the electronic control throttle opening in the cases of all cylinders operation and cylinder deactivation operation, respectively.

Firstly, in times of cylinder deactivation operation, in the case where the torque required by the power source is sufficiently low, and the required torque can be supplied by just the torque of the engine E, the electronic control throttle opening depending on the accelerator pedal opening AP is set by the cylinder deactivation time line LS, and the engine torque depending on this set electronic control throttle opening by the line LQ. Consequently, as the accelerator pedal opening becomes greater, the electronic control throttle opening increases along the line LS, and the engine torque depending on this increase in electronic control throttle opening also increases along the line LQ. This control is continued as is until the required torque becomes greater than the torque able to be supplied under cylinder deactivation operation (exceeds engine torque TRQ1).

Next, when the accelerator pedal opening exceeds the threshold value AP1 (corresponding to APCSH), the torque required by the power source ends up exceeding the torque TRQ1 able to be supplied under the cylinder deactivation operation. In this case, the part of the torque which has exceeded the torque TRQ1 is supplied by the motor M, and engine E assist control is performed. At this time, the electronic control throttle opening is maintained at the threshold value W1 at the time of AP, and as a result the torque supplied by the engine E is maintained at TRQ1. In this way, even in the case where the torque required by the engine E has exceeded the torque TRQ1 able to be supplied under the cylinder deactivation operation, by assist from the motor M, cylinder deactivation operation of the engine E can continue, and it is possible to extend the range of cylinder deactivation operation.

Furthermore, while the motor M is supplying torque, by fixing the electronic control throttle opening (in this case W1), the torque supplied by the engine E can be maintained at a constant. In the present embodiment, the torque TRQ1 is set at such that a value of the specific fuel consumption becomes the lowest. As a result, fuel supplied to the engine E can be used extremely effectively, and it becomes possible to greatly contribute to an improvement in fuel consumption efficiency. This control is continued as is until the required torque becomes greater (exceeds torque TRQ2) than the sum of the torque able to be supplied by the engine E under cylinder deactivation operation and the torque able to be supplied by the motor M.

Next, when the accelerator pedal opening AP exceeds the threshold value AP2, the torque required by the power source ends up exceeding the sum of the torque TRQ1 able to be supplied by the engine E under cylinder deactivation operation and the torque able to be supplied by the motor M. In this case, the torque supplied from the motor M is switched to "0", and the operating state of the engine E moves from cylinder deactivation to all cylinders operating. At this time, the electronic control throttle opening changes from the opening W1 corresponding to the engine torque TRQ1, to the opening W2 corresponding to the engine torque TRQ2, to perform control so that shock caused by changing the engine torque does not occur. After this, the electronic control throttle opening is controlled along the line LR, and the engine E performs all cylinders operation along the line LP.

In this way, even in the case where the torque required by the engine E exceeds the torque TRQ1 able to be supplied in the cylinder deactivation operation, due to the assist performed by the motor M, cylinder deactivation operation of the engine E can be maintained, and it becomes possible to extend the range of cylinder deactivation operation.

Furthermore, the torque TRQ2 for switching from the cylinder deactivation operation to all cylinders operation, changes depending on the torque able to be supplied by the motor M.

Figure 6:
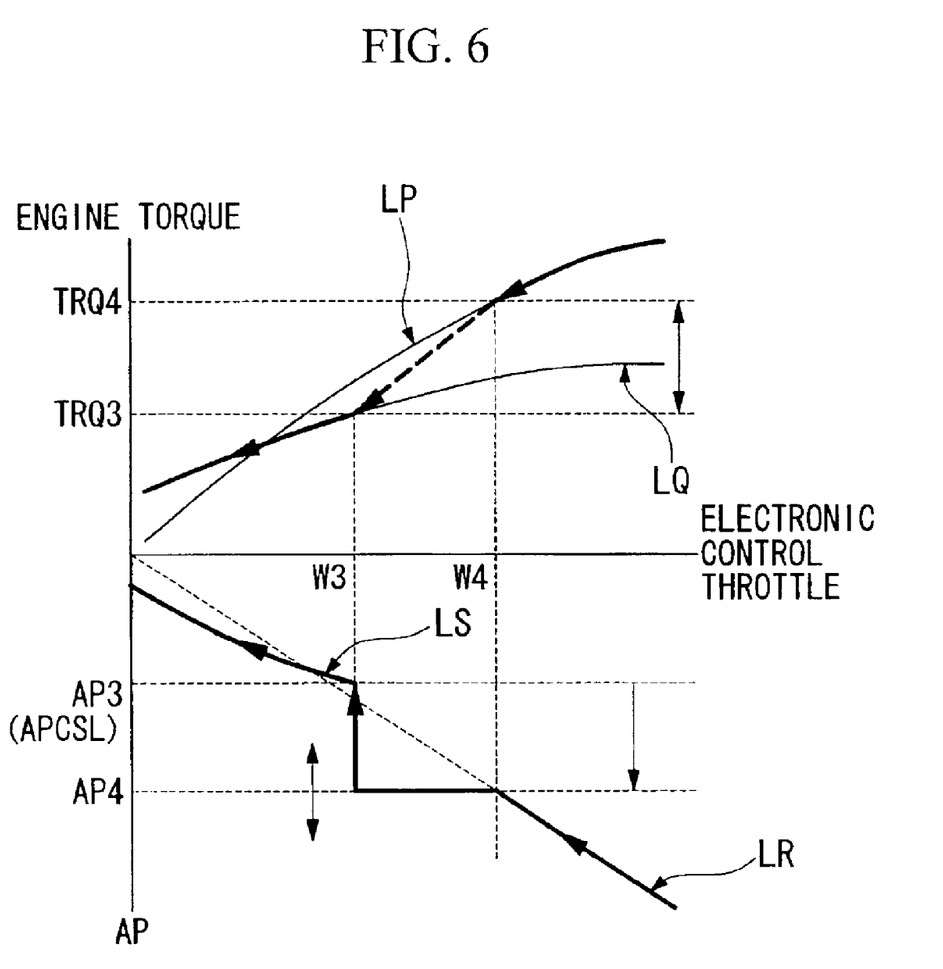
FIG. 6 is a graph showing the relationship between electronic control throttle opening, and the engine torque and accelerator pedal, when moving from all cylinders operation to cylinder deactivation operation.

FIG. 6 is a diagram explaining the case where the engine operating state moves from all cylinders operation to cylinder deactivation operation. In the same way as in FIG. 5, the horizontal axis of this graph represents the electronic control throttle opening, the upper part of the vertical axis represents the engine torque, and the lower part of the vertical axis represents the accelerator pedal opening. Also, the lines LP, LQ, and LR, LS respectively denote the engine torque and the accelerator pedal opening depending on the electronic control throttle opening in the cases of all cylinders operation and cylinder deactivation operation.

In the all cylinders operation, when the accelerator pedal opening AP decreases, the electronic control throttle opening depending on this accelerator pedal opening AP decreases via the line LR, and the engine torque depending on the decrease of this electronic control throttle opening, decreases via the line LP. This control is continued as is until the torque required by the power source becomes equal to the sum (engine torque TRQ4) of the engine E torque able to be supplied under cylinder deactivation operation and the torque able to be supplied by the motor M.

Next, when the accelerator pedal opening decreases below the threshold value AP4, the required torque becomes smaller than the sum (engine torque TRQ4) of the torque TRQ3 able to be supplied by the engine E under the cylinder deactivation operation and the torque able to be supplied by the motor M. At this time, the torque supplied from the engine E is immediately changed from all cylinders operation torque TRQ4 to cylinder deactivation operation torque TRQ3, to move from all cylinders operation to cylinder deactivation operation. At this time, the part of the torque exceeding the torque TRQ3 of the supplied torque is supplied by the motor M. Also, when changing the engine E torque, immediately switching the electronic control throttle opening from W4 to W3 adjusts the torque change according to the operating state change. Then, until the required torque becomes equal to or less than TRQ3, this control is maintained, and the electronic control throttle opening is maintained in the W3 state. Here, the torque TRQ3 under cylinder deactivation operation is set to the lowest torque for yielding the lowest net fuel consumption, and contributes to an improvement in fuel consumption efficiency.

Then, when the accelerator pedal opening AP becomes smaller than the threshold value AP3 (corresponding to APCSL), the torque required by the power source becomes smaller than the engine torque TRQ3, and due to the assist by the motor M becoming unnecessary, the torque supplied by the motor M switches to "0". After this, the electronic control throttle opening is controlled along the line LS, and the engine E performs cylinder deactivation operation along the line LQ.

In this way, in the case of switching from all cylinders operation to cylinder deactivation operation, because the range of cylinder deactivation operation can be extended compared to the conventional technology, fuel consumption efficiency can be improved.

In the embodiment, the determination of the switching between cylinder deactivation operation and all cylinders operation was performed based on the torque of the engine and the motor. However, instead of this, it is possible for control to be performed based on the output of the engine and the motor.

As described above, according to the first aspect of the invention, operating under partial cylinder deactivation is possible even in the case where the required output or torque is larger than the output or torque of the engine under partial cylinder deactivation. Therefore it becomes possible to extend the range in which partial cylinder deactivation is possible, and as a result, an improvement in fuel consumption efficiency can be obtained.

Also, according to the second aspect of the invention, it is possible to determine whether the partial cylinder deactivation is possible or not, under even more detailed conditions.

Furthermore, according to the third aspect of the invention, fuel supplied by the engine can be used extremely effectively, and it becomes possible to greatly contribute to an improvement in fuel consumption efficiency.

Also, according to the fourth aspect of the invention, by changing the output or torque adjustable by the motor, even more detailed control becomes possible.

Furthermore, according to the fifth aspect of the invention, the possibility of discomfort occurring when switching operating states can be further reduced.

Also, according to the sixth aspect of the invention, the possibility of discomfort occurring can be reduced, without changing the driving force characteristics of the vehicle with respect to the operation of the accelerator pedal.

What is claimed is:

1. A control apparatus for a hybrid vehicle, the hybrid vehicle comprising a motor and an engine, which is capable of executing a partial cylinder deactivation operation by deactivating a part of cylinders of the engine, as a power source for driving the hybrid vehicle by transmitting power of at least one of the motor and the engine to the wheels, wherein
when the output required for the power source is larger than the output of the engine under the partial cylinder deactivation operation, and is smaller than the total of the output of the engine under partial cylinder deactivation operation and the output of the motor, which is adjustable for assisting the engine output,
the control apparatus of the hybrid vehicle operates the engine under the partial cylinder deactivation operation and controls the motor output for compensating the difference between the total required output of the power source and the engine output under the partial cylinder deactivation operation.

2. A control apparatus for a hybrid vehicle according to claim 1, wherein the control apparatus determines whether it is possible for the engine to be operated under the partial cylinder deactivation operation based on at least one of the parameters comprising the temperature of said motor, the state of charge of a power storage unit which supplies energy to said motor, the temperature of said power storage unit, and the temperature of electrical equipment connected to said power storage unit.

3. A control apparatus for a hybrid vehicle according to claim 1, wherein when the control apparatus of the hybrid vehicle adjusts the output of the vehicle by controlling the motor output, the output of said engine under partial cylinder deactivation operation is maintained at an output to give the lowest net fuel consumption.

4. A control apparatus for a hybrid vehicle according to claim 1, wherein when the total output of the power source is adjusted by controlling the motor output, the motor output is controlled based on at least one of the parameters of, the rating of the motor, the temperature of the motor, and the state of charge of said power storage unit, or the temperature of said power storage unit.

5. A control apparatus for a hybrid vehicle according to claim 1, wherein when the operating state of said engine is switched between the state under the partial cylinder deactivation operation and the state under all cylinders operation in which all the cylinders of the engine are operating, a difference between the engine output under all cylinders operation and the engine output under partial cylinder deactivation operation is adjusted by controlling the degree of opening of an electronic control throttle.

6. A control apparatus for a hybrid vehicle according to claim 1, wherein the total output of the engine and the motor is controlled so as to maintain at an identical output when the operating conditions such as the required output are maintained at the same value.

* * * * *